(12) United States Patent
Ogasawara

(10) Patent No.: US 8,602,954 B2
(45) Date of Patent: Dec. 10, 2013

(54) TOOL MAGAZINE

(75) Inventor: Susumu Ogasawara, Yamanashi (JP)

(73) Assignee: Makino Milling Machine Co., Ltd. (JP)

( * ) Notice: Subject to any disclaimer, the term of this patent is extended or adjusted under 35 U.S.C. 154(b) by 650 days.

(21) Appl. No.: 12/918,410

(22) PCT Filed: Feb. 22, 2008

(86) PCT No.: PCT/JP2008/053587
§ 371 (c)(1),
(2), (4) Date: Aug. 19, 2010

(87) PCT Pub. No.: WO2009/104280
PCT Pub. Date: Aug. 27, 2009

(65) Prior Publication Data
US 2010/0323863 A1    Dec. 23, 2010

(51) Int. Cl.
*B23Q 3/157* (2006.01)
(52) U.S. Cl.
USPC .............................. 483/63; 483/60; 211/70.6
(58) Field of Classification Search
USPC ............ 483/60, 61, 62, 63, 64, 37; 211/70.6, 211/74, 75
See application file for complete search history.

(56) References Cited

U.S. PATENT DOCUMENTS

| | | | | |
|---|---|---|---|---|
| 5,107,581 | A * | 4/1992 | Reuter et al. | 483/61 |
| 6,325,748 | B1 * | 12/2001 | Watanabe et al. | 483/1 |
| 7,506,770 | B2 * | 3/2009 | Rief | 211/70.6 |
| 7,635,327 | B1 * | 12/2009 | Liao | 483/37 |
| 7,731,644 | B2 * | 6/2010 | Muser | 483/61 |
| 8,157,337 | B2 * | 4/2012 | Manalang et al. | 312/249.8 |

FOREIGN PATENT DOCUMENTS

| | | | |
|---|---|---|---|
| EP | 0522498 A1 | 1/1993 | |
| JP | 57201148 A * | 12/1982 | ............ B23Q 3/157 |
| JP | 59166437 A * | 9/1984 | ............ B23Q 3/155 |
| JP | 63057134 A | 3/1988 | |
| JP | 4-29336 U | 3/1992 | |
| JP | 4-300140 | 10/1992 | |
| JP | 4-322937 A | 11/1992 | |
| JP | 09108976 A | 4/1997 | |
| JP | 2710477 B2 | 2/1998 | |
| JP | 10296568 A | 11/1998 | |
| JP | 11099431 A | 4/1999 | |
| JP | 2006088274 A | 4/2006 | |

* cited by examiner

*Primary Examiner* — David Bryant
*Assistant Examiner* — Jason L Vaughan
(74) *Attorney, Agent, or Firm* — Paul & Paul

(57) ABSTRACT

A tool, magazine (11) for accommodating a plurality of tools (T) comprising a first tool housing portion (17) and second tool housing portions (19, 21, 23) in which a plate-like member having a plurality of tool receiving holes (17a, 17b) and tool receiving recesses (19b, 21b, 23b) formed thereto and each of the tool receiving holes and the tool receiving recesses has at least three supporting members having a convex portion which engages with a V-shape trench of a tool, and a tool transporting means (25) so disposed to face a back surface of the first and second tool housing portions for transporting the tool to/from the first and second tool housing portions from/to a tool exchange position (P), wherein the second tool housing portions are disposed rearwardly offset with respect to the first tool housing portion.

7 Claims, 7 Drawing Sheets

TOOL MAGAZINE

TECHNICAL FIELD

The present invention relates to a tool magazine arranged adjacent to a machine tool. More specifically, the present invention relates to a tool magazine in which a plurality of tools are accommodated and arranged in procession.

BACKGROUND ART

Generally, a tool magazine is arranged adjacent to a machine tool and accommodates a number of tools. A tool changer transfers one of the tools accommodated in the tool magazine to the machine tool, and at the same time receives a tool from the machine tool to send it to the tool magazine.

Tool magazines of various types have been developed. JP-A-4-300140 discloses a first prior art of the tool magazine, which includes a tool accommodating portion for holding a plurality of tools arranged in a matrix. The tool accommodating portion includes a plurality of plates which define a plurality of U-shaped cutout portions and are disposed one over the other. The U-shaped cutout portions eliminate use of additional adapters whereby the manufacturing cost is reduced. In this tool magazine, tools are held by the U-shaped cutout portions engaged with annular grooves in tool holders attached to the ends of the tools. When conveying one of the tools from the tool accommodating portion, the tool is held by engaging an adapter of a tool conveyer with a tapered shank portion of the tool holder.

JP-B-2710477 discloses a second prior art of the tool magazine. This tool magazine includes: a magazine base in which holes, through which blade portions of the tools attached to the tool holders can pass, are arranged in procession in the lateral and longitudinal directions and a holding means for detachably holding the tools are provided in the hole portions; and a tool conveying mechanism capable of moving in the directions of X-axis, Y-axis and Z-axis on the rear side of the magazine base.

DISCLOSURE OF THE INVENTION

Recently, in the field of machine tools, working process speed has increased and the working process has become complicated. Accordingly, various type tools have been used for the machine tools. Therefore, tool magazines arranged adjacent to the machine tools are required to be able to accommodate tools of various types.

In the tool magazine disclosed in the first prior art described above, it is necessary to provide a driving mechanism capable of moving plates up and down so that an interval, in which the tools can pass, can be ensured between a plate, on which the tool to be conveyed is accommodated, and a plate adjacent to the above plate. Accordingly, the constitution becomes complicated.

In the tool magazine disclosed in the second prior art described above, a plate-shaped magazine base, on which tools are accommodated, is provided on only one plane. Accordingly, in the case where both long and short tools are accommodated together, it is necessary to provide a tool accommodating space, the thickness in the Z-axis direction of Z-axis of which is made to agree with the length of the long tool. Further, it is necessary to provide a tool conveying mechanism having a stroke in the direction of Z-axis by which the tool of long length can pass in a hole of the magazine base. Therefore, the thickness of the entire tool magazine in the direction of Z-axis is more than twice as much as longest tool. In the case where the tool of long length is manually attached to and detached from the tool magazine, since the working is executed in the circumstances in which long tools are arranged in procession, the working and safety become deteriorated.

Therefore, the technical task to be accomplished by the present invention is to solve the above problems of the prior art. An object of the present invention is to provide a tool magazine of simple structure capable of accommodating a plurality of tools arranged in procession. Another object of the present invention is to provide a tool magazine characterized in that when a long tool is manually attached to and detached from the tool magazine, the working can be easily and safely carried out. Still another object of the present invention is to provide a tool magazine characterized in that the entire thickness of the tool magazine including the tool conveying device in the direction of the central axis of the tool to be accommodated is reduced as small as possible.

In order to accomplish the above objects, the present invention provides a tool magazine for accommodating a plurality of tools so that central axes of the tools can be horizontal and parallel with each other, comprising:

a first tool accommodating portion having a tool holding member formed out of a plate-shaped member on which a plurality of tool receiving holes in which the tools can pass are formed, the tool holding member holding the tools when lower portions of the tool receiving holes are engaged with V-shaped grooves of flange portions of the tools; and a second tool accommodating portion having a tool holding member, which is arranged in the periphery of the first tool accommodating portion, formed out of a plate-shaped member on which a plurality of tool receiving dent portions capable of receiving the tools are formed, the tool holding member holding the tools when lower portions of the tool receiving dent portions are engaged with the V-shaped grooves of the flange portions of the tools, wherein the second tool accommodating portion is arranged at the rear of the first tool accommodating portion on a face different from the face of the first tool accommodating portion.

The first tool accommodating portion is made to hold tools, the diameters of which can pass in the tool receiving holes and the length of which is not more than a predetermined value. The second tool accommodating portion is made to hold tools, the length of which exceeds a predetermined value. In the first and the second tool accommodating portion, the tools are held in such a manner that the V-shaped grooves of the flange portions of the tools are engaged with the tool holding member. The second tool accommodating portion is arranged at the rear of the first tool accommodating portion on a face different from the face of the first tool accommodating portion. That is, the first tool accommodating portion and the second tool accommodating portion are arranged in parallel with each other and the second tool accommodating portion is arranged being shifted to the shank side of the accommodated tool from the first tool accommodating portion. Accordingly, the flange portions of the tools accommodated in the second tool accommodating portion are located at the rear of the flange portions of the tools accommodated in the first tool accommodating portion. Short tools are attached to and detached from the first tool accommodating portion in the direction parallel to the central axes of the tools. Long tools are attached to and detached from the second tool accommodating portion in the direction perpendicular to the central axes of the tools.

The second tool accommodating portion can be arranged at least on one of the left side, the right side, the upper side and the lower side of the front of the first tool accommodating portion.

Due to this constitution, when the tool magazine is viewed from the front, short tools are accommodated in the first tool accommodating portion of the central portion and long tools are accommodated in the second tool accommodating portion located at least on one of the left side, the right side, the upper side and the lower side of the first tool accommodating portion.

The tool holding member includes at least three top-shaped members having protrusion portions, which are arranged in the peripheries of the tool receiving holes and the tool receiving dent portions, engaging with the V-shaped grooves of the flange portions of the tools.

The tools accommodated in the first and the second tool accommodating portion are held so that the central axes of the tools can be maintained horizontal and parallel to each other when the V-shaped grooves of the flange portions of the tools and the protrusions of at least three top-shaped members are engaged with each other by the self-weight at the lower portions of the first tool receiving holes and the lower portions of the second tool receiving dent portions.

The tool magazine further comprises a tool conveying device, the tool conveying device including:

a tool holding means for holding shank portions of the tools, arranged at the rear of the first and the second tool accommodating portion in the direction of the central axes of the accommodated tools; and a moving means for moving the tool holding means in the directions of three axes making a right angle with each other.

The tool holding means of the tool conveying device holds the shank portions of the tools from the rear of the central axes of the tools. The tool holding means is moved by the moving means in the directions of three axes making a right angle. When short tools are held, the tool conveying device makes the tools pass in the tool receiving holes in the direction of the central axes of the tools so that the tools can be attached to and detached from the first tool accommodating portion. At the time of holding the long tools, the tool conveying device crosses the tool receiving dent portions in the direction perpendicular to the central axes of the tools so that the tools can be attached to and detached from the second tool accommodating portion. The tool conveying device conveys the tools between the first and second tool accommodating portions and the tool changing position and further positions the tool holding means at the tool changing position.

According to the present invention, the constitution of the first and the second tool accommodating portion is simple, in which the tool holding member is provided in such a manner that the tool receiving holes or the tool receiving dent portions are formed on the plate-shaped member. The tools can be accommodated in the tool accommodating portion in procession. Short tools are accommodated in the first tool accommodating portions and attached to and detached from it in the direction parallel to the central axes of the tools. Long tools are accommodated in the second tool accommodating portion and attached to and detached from it in the direction perpendicular to the central axes of the tools. Therefore, the tools can be easily and safely attached to and detached from the tool accommodating portions. Further, it is possible to reduce a working space necessary for attaching and detaching the tools.

When at least three top-shaped members are arranged for one tool receiving hole or tool receiving dent portion, the tools can be securely held by an inexpensive structure so that the tools can be maintained horizontal and parallel to each other. The thickness of the entire tool magazine corresponds to the total length of: the length of the short tools held in the first tool holding portion; the stroke substantially equal to the length of the short tool to be attached to and detached from the tool accommodating portion by the tool conveying device in the direction of the central axes of the tools; and the entire length of the tool conveying device in the direction of the central axes of the tools when the tool conveying device goes back in the direction of the central axes of the tools. Since the long tools are attached to and detached from the second tool accommodating portion only by a movement perpendicular to the central axes of the tools and a movement in the direction of the central axes of the tools is not needed, it is possible to accommodate long tools, which are longer than the length corresponding to the stroke of the movement of the tool conveying device in the direction of the central axes of the tools in the second tool accommodating portion, i.e., it is possible to accommodate long tools, the length of which is substantially twice as long as the shortest tools held by the first tool accommodating portion, in the second tool accommodating portion. Accordingly, it is possible to reduce the entire thickness of the tool magazine as small as possible, in which the long and short tools must be accommodated, in the direction of the central axes of the tools.

THE MOST PREFERRED EMBODIMENT

Figure 1:
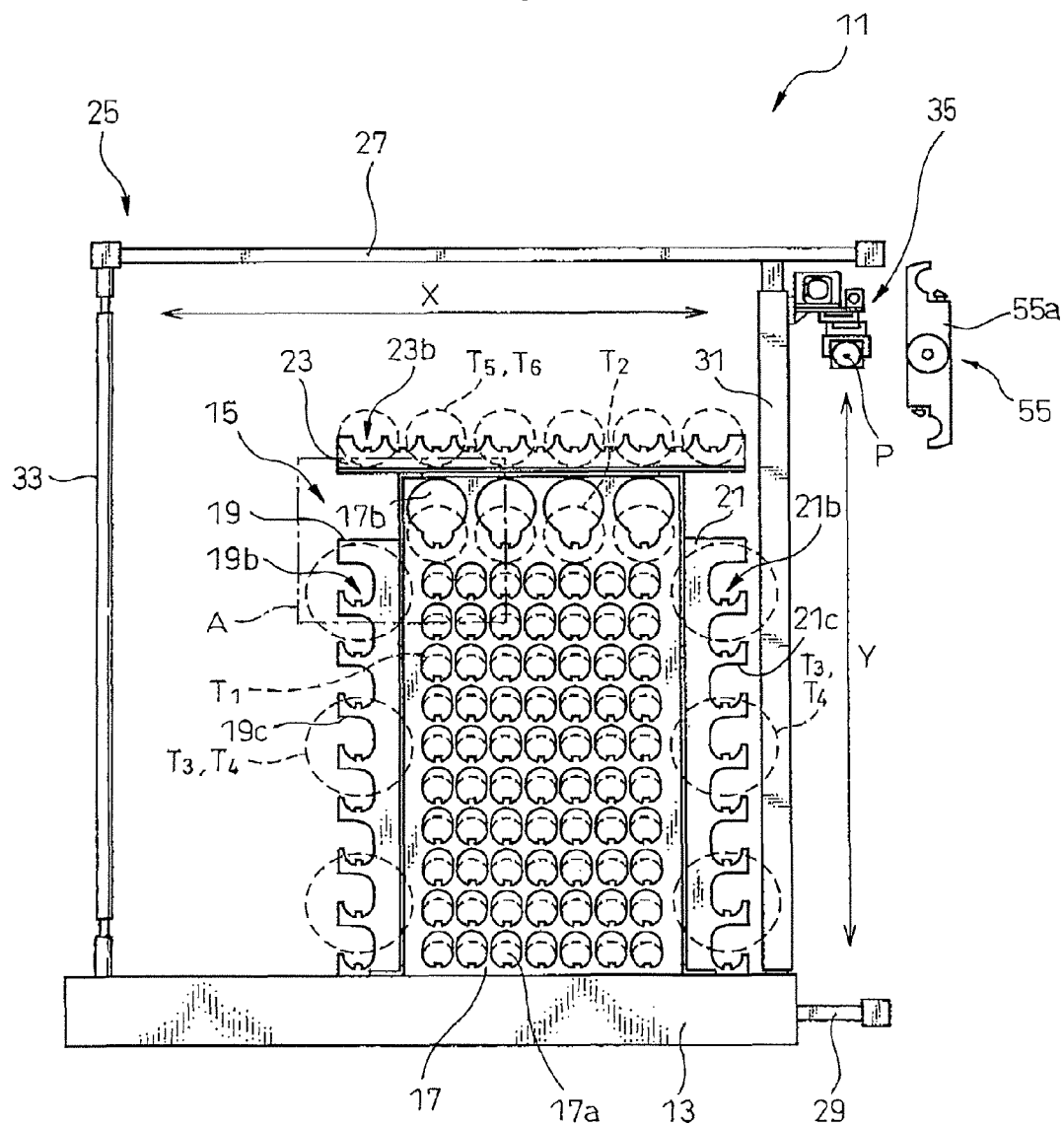
FIG. 1 is a front view of the tool magazine of the preferred embodiment of the present invention.
Figure 2:
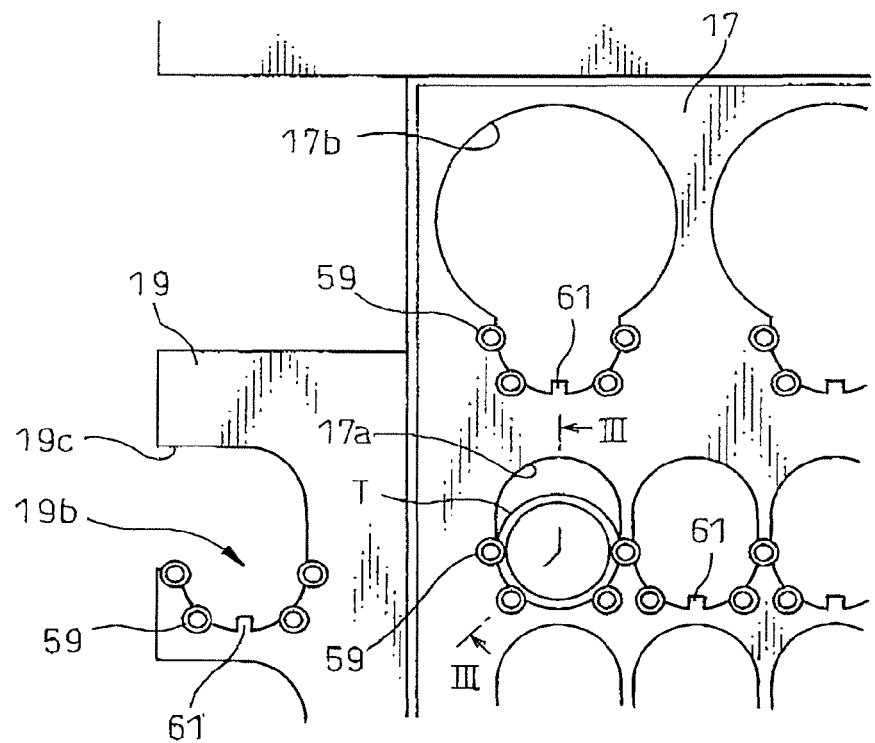
FIG. 2 is an enlarged view of portion A in FIG. 1.
Figure 3:
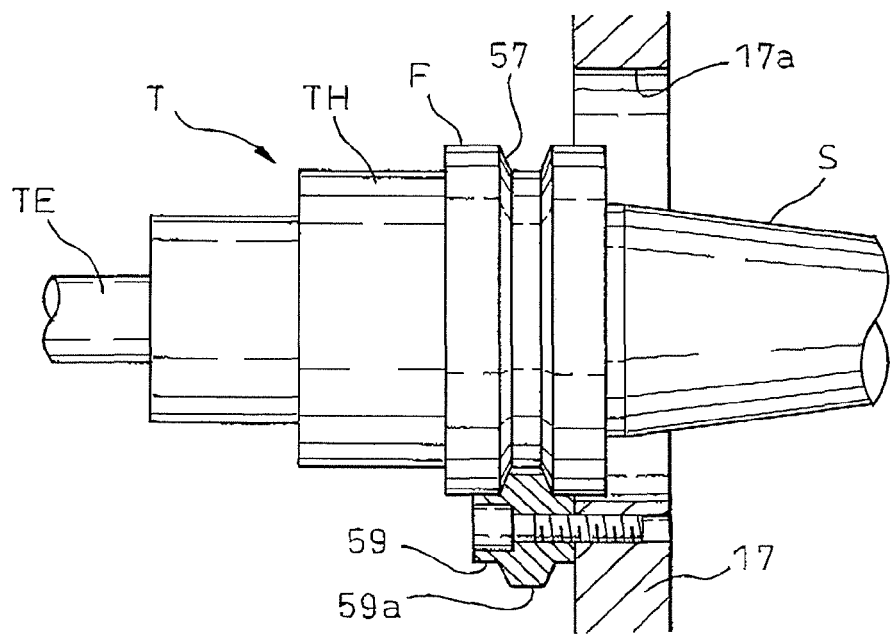
FIG. 3 is a sectional view taken on line in FIG. 2.

Referring to the accompanying drawings, the most preferred embodiment of the present invention will be explained below.

A tool magazine 11, in which a large number of tools T are accommodated, is positioned adjacent to a machine tool. Through a tool changer 55 arranged outside the tool magazine 11, the tool magazine 11 supplies the tools T to the machine tool and receives the tools T from the machine tool. The tool T of the present embodiment includes a cutting blade portion TE and a tool holder TH. The tool holder TH includes a flange portion F, in which an annular V-shaped groove 57 is formed, and a tapered shank portion S. The tool magazine 11 includes: a tool rack 15 arranged on an upper horizontal face of the base 13; and a tool conveying device 25. The tool changer 55 includes a tool changing arm 55a. In the present embodiment, the tool changing arm 55a changes the tool between a tool changing position P of the tool magazine 11 and a main shaft (not shown) of the machine tool.

The tool rack 15 includes: a rack body portion 17 forming a first tool accommodating portion; a pair of side rack portions 19, 21 forming a second tool accommodating portion; and an upper rack portion 23. The rack body portion 17 is formed out of a plate-shaped member vertically arranged on an upper face of the base 13. In this description, the terminology is defined as follows. A perpendicular plane on which the rack body portion 17 is formed is defined as XY-plane. An axis in the horizontal direction is defined as X-axis. An axis in the vertical direction is defined as Y-axis. An axis in the direction perpendicular to XY plane is defined as Z axis. Tools T are accommodated in the tool rack 15 so that central axes of the tools T can be parallel to Z-axis. A side of the shank portions S of the accommodated tools T is defined as the rear of the tool magazine 11.

The side rack portions 19, 21 are formed out of plate-shaped members vertically arranged on an upper face of the base 13. The side rack portions 19, 21 are arranged at the rear of the rack body portion 17 being distant from the rack body portion 17 by a predetermined distance, i.e., the side rack portions 19, 21 are arranged being offset from the rack body portion 17 to the tool conveying device 25 side. In the present embodiment, the side rack portions 19, 21 are connected to side edge portions of the rack body portion 17 by the side walls 19a, 21a. Due to the above structure, the rack body portion 17 and the side rack portions 19, 21 are firmly arranged on an upper face of the base 13.

The upper rack portion 23 is formed out of a plate-shaped member parallel with the rack body portion 17. The upper rack portion 23 is horizontally extended in an upper portion of the tool rack 15. Further, the upper rack portion 23 is arranged being offset from the rack body portion 17 in the direction of Z-axis by a predetermined distance. In the embodiment shown in the drawing, the upper rack portion 23 is formed out of a vertical portion of an L-shaped angle member. By the vertical portion 23a of the L-shaped angle member, the upper rack portion 23 is connected to upper end portions of the side walls 19a, 21a of the side rack portions 19, 21.

In the embodiment shown in the drawing, the side rack portions 19, 21 and the upper rack portion 23, which compose the second tool accommodating portion, are offset from the rack body portion 17 to the rear along Z-axis and arranged on the substantially same plane. However, depending upon the use of the tool magazine, both are not necessarily arranged on the same plane. The second tool accommodating portion may be arranged in a lower portion of the rack body portion 17.

In the rack body portion 17, a plurality of tool receiving holes are formed which are arranged in a matrix form so that the tools can be made to pass in the holes in the direction of Z-axis. In the embodiment which is shown here as an example, the tool receiving holes of the rack body portion 17 includes: first tool receiving holes 17a which are arranged in a matrix form of 10 lines and 7 rows; and four second tool receiving holes 17b arranged on the upper side of the first tool receiving holes 17b in the uppermost step in a lateral line. The first tool receiving holes 17a hold short tools $T_1$, the diameters of which are relatively small. The second tool receiving holes 17b hold tools $T_2$, the diameters of which are relatively large when it is compared with the diameters of the tools $T_1$.

The first and the second tool receiving holes 17a, 17b are formed as follows. Upper side inner edge portions of the receiving holes are formed into an arc shape, the diameter of which is larger than the diameter of the tool to be accommodated. Lower side inner edge portions of the receiving holes are formed into an arc shape, the diameter of which is a little larger than the diameter of the flange portion F of the tool T to be held. The upper side inner edge portions and the lower side inner edge portions are not necessarily formed into an arc shape, for example, the upper side inner edge portions and the lower side inner edge portions may be formed into a rectangle, a pentagon or another polygon. The first and the second tool receiving holes 17a, 17b may be provided with the upper side and the lower side inner edge portions having a size and shape by which the tools T held in the tool receiving holes can be made to pass in the tool receiving holes 17a, 17b.

In the periphery of the lower side inner edge portion of each tool receiving hole 17a, 17b of the rack body portion 17, four top-shaped members 59 are attached for one tool receiving hole. When annular protrusions 59a of the top-shaped members 59 are engaged with the v-shaped grooves 57 of the flange portions F, the tools T are held by the rack body portion 17 so that the central axes of the tools T can be maintained horizontally parallel with each other. One of the two lower top-shaped members in the four top-shaped members 59 may be omitted. That is, it is sufficient that at least three top-shaped members 59 for one tool receiving hole are provided. A key 61 is provided at the center of the lower side inner edge portion of each tool receiving hole 17a, 17b. The key 61 is engaged with a key way (not shown) formed in the flange portion F, so that a rotary direction of the tool T can be positioned. In this connection, instead of the top-shaped member 59, a semi-annular member having an arcuate protrusion engaging with the V-shaped groove 57 may be attached to the lower side of each tool receiving hole 17a, 17b. A sectional shape of the lower inner edge portion of each tool receiving hole 17a, 17b may be formed into a semi-arcuate protrusion engaging with the V-shaped groove 57 so that the tool T can be directly held by the rack body portion 17.

In each side rack portion 19, 21 forming the second tool accommodating portion, a plurality of tool receiving dent portions 19b, 21b, which are longitudinally arranged in a row, are formed. In the present embodiment shown here as an example, eight tool receiving dent portions 19b, 21b are formed. In the side rack portions 19, 21, cutout portions 19c, 21c, the cutout width of which is a little larger than the diameter of the flange portion F of the tool T, are provided so that the tools T can be introduced into the tool receiving dent portions 19b, 21b when the tools T are moved in the direction of X-axis. In the same manner as that of the first and the second tool receiving holes 17a, 17b of the rack body portion 17, four top-shaped members 59 are attached to the peripheries of the lower side inner edge portions of the tool receiving dent portions 19b, 21b of the side rack portions 19, 21 so that the tools can be held. The tool receiving dent portions 19b, 21b of the side rack portions 19, 21 hold the tool $T_3$ or $T_4$, the diameter of which is larger than that of the tool $T_1$, $T_2$ and/or the length of which is longer than that of the tool $T_1$, $T_2$.

In the present specific embodiment, the tool receiving dent portions 19b, 21b of the side rack portions 19, 21 introduce the tools T in the direction of X-axis through the cutout portions 19c, 21c. Therefore, it is not necessary that the upper side inner edge portion, the diameter of which is larger than that of the tool T, be provided like the first and the second tool receiving hole 17a, 17b of the rack body portion 17.

In the upper rack portion 23 forming the second tool accommodating portion, a plurality of tool receiving dent portions 23b, which are laterally arranged in a row, are formed. In the present embodiment shown here as an example, eleven tool receiving dent portions 23b are formed. The cutout width of the tool receiving dent portion 23b is a little larger than the diameter of the flange portion F of the tool T to be accommodated. The tool receiving dent portion 23b is formed into an arcuate cutout shape open upward. Four top-shaped members 59 are attached to the periphery of the lower side inner edge portion of the tool receiving dent portion 23b so as to hold the tool T. The tool receiving dent portion 23b of the upper rack portion 23 holds the tool $T_5$ or $T_6$, the diameter of which is larger than that of the tool $T_1$, $T_2$ and/or the length of which is longer than that of the tool $T_1$, $T_2$.

In the present embodiment, a half size of the longest tool of $T_3$, $T_4$, $T_5$ or $T_6$ to be accommodated is defined as a predetermined tool length. A tool, the length of which is not more than the predetermined tool length, the diameter of which is capable of passing in the tool receiving hole 17a, 17b, is defined as a short tool $T_1$ or $T_2$. A tool, the length of which exceeds the predetermined length, is defined as $T_3$, $T_4$, $T_5$ or $T_6$. An amount of offset of the side rack portion 19, 21 from the rack body portion 17 in the direction of Z-axis or an amount of offset of the upper rack portion 23 from the rack body portion 17 in the direction of Z-axis is determined to be a size a little longer than the predetermined length.

The tool conveying means 25 for conveying tools between the tool rack 15 and the tool changing position P includes: a carriage 35 detachably holding the tool T; upper and lower rails 27, 29 which are a carriage moving means for moving the carriage 35 on the XY plane and extended in the direction of X-axis; a motive power transmitting member 33 provided between the upper and lower rails 27, 29 and extended in the direction of Y-axis; and a moving column 31 capable of reciprocating in the direction of X-axis along the upper and lower rails 27, 29. The carriage 35 is attached being capable of reciprocating in the direction of Y-axis along the moving column 31.

In the upper and lower rails 27, 29, for example, ball screws (not shown) are provided. In the upper and lower end portions of the moving column 31, nuts (not shown) engaged with the ball screws are attached. The ball screws of the upper and lower rails 27, 29 are engaged with a gear (not shown) provided at the end portion of the motive power transmitting member 33. When the motive power transmitting member 33 is rotated by a motor (not shown), the ball screws of the upper and lower rails 27, 29 are rotated synchronously with each other. Due to the foregoing, the moving column 31 can be reciprocated in the direction of X-axis along the upper and lower rails 27, 29.

The carriage 35 is formed out of a plate-shaped member extended in the direction of Z-axis. The carriage 35 is provided with a base portion 37 attached to the moving column 31 so that the base portion 37 can be reciprocated in the direction of Y-axis. A ball screw 39 extended in the direction of Z-axis and a motor 41 for driving the ball screw 39 are attached onto the upper face of the base portion 37. The first guide rail 43 extended in the direction of Z-axis is fixed onto a lower face of the base portion 37. A first slider 47 is attached to the first guide rail 43 so that the first slider 47 can be reciprocated along the first guide rail 43. A nut 45 engaging with the ball screw 39 is attached to the first slider 47. (In FIGS. 5 to 8, a nut holder is shown.) The second guide rail 49 is fixed to the first slider 47. The second guide rail 49 can be reciprocated in the direction of Z-axis together with the first slider 47. The second slider 51 capable of reciprocating along the second guide rail 49 is attached to the second guide rail 49. An arm 53 is fixed to the second slider 51. A forward end portion of the arm 53 has a tapered hole engaging with the shank portion S of the tool holder TH of the tool T. The tool holding means 63 for detachably holding the tool T is fixed to the tapered hole. In the present embodiment, movements of the tool conveying device in the directions of X-axis, Y-axis and Z-axis and an action of holding the tool are controlled by NC control unit (not shown) of the machine tool.

A mode of operation of the present embodiment will be explained below.

Figure 5:
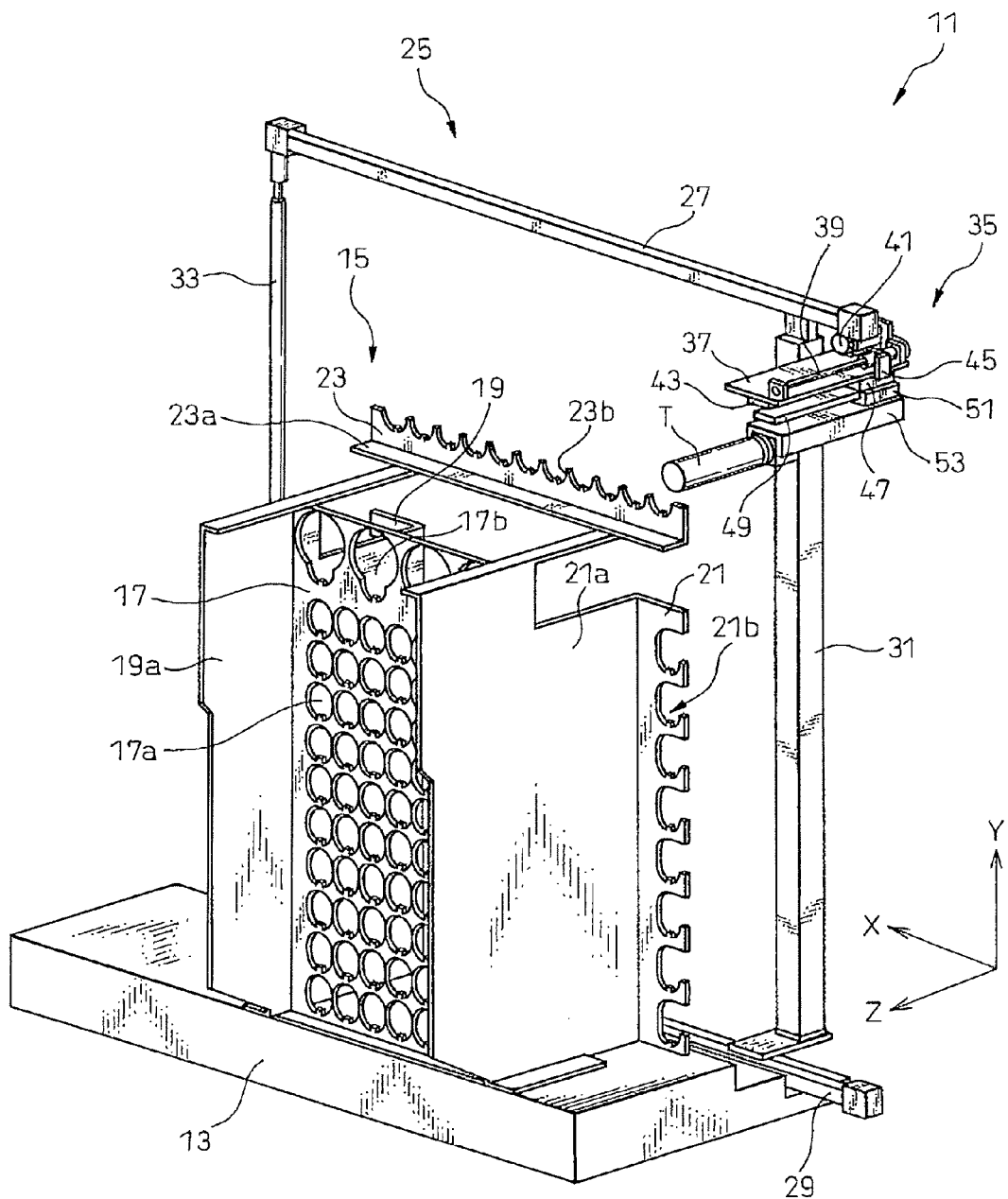
FIG. 5 is a perspective view of the tool magazine shown in FIG. 1 for explaining an action of attaching tools to a rack body portion, wherein a carriage is located at a tool changing position.
Figure 6:
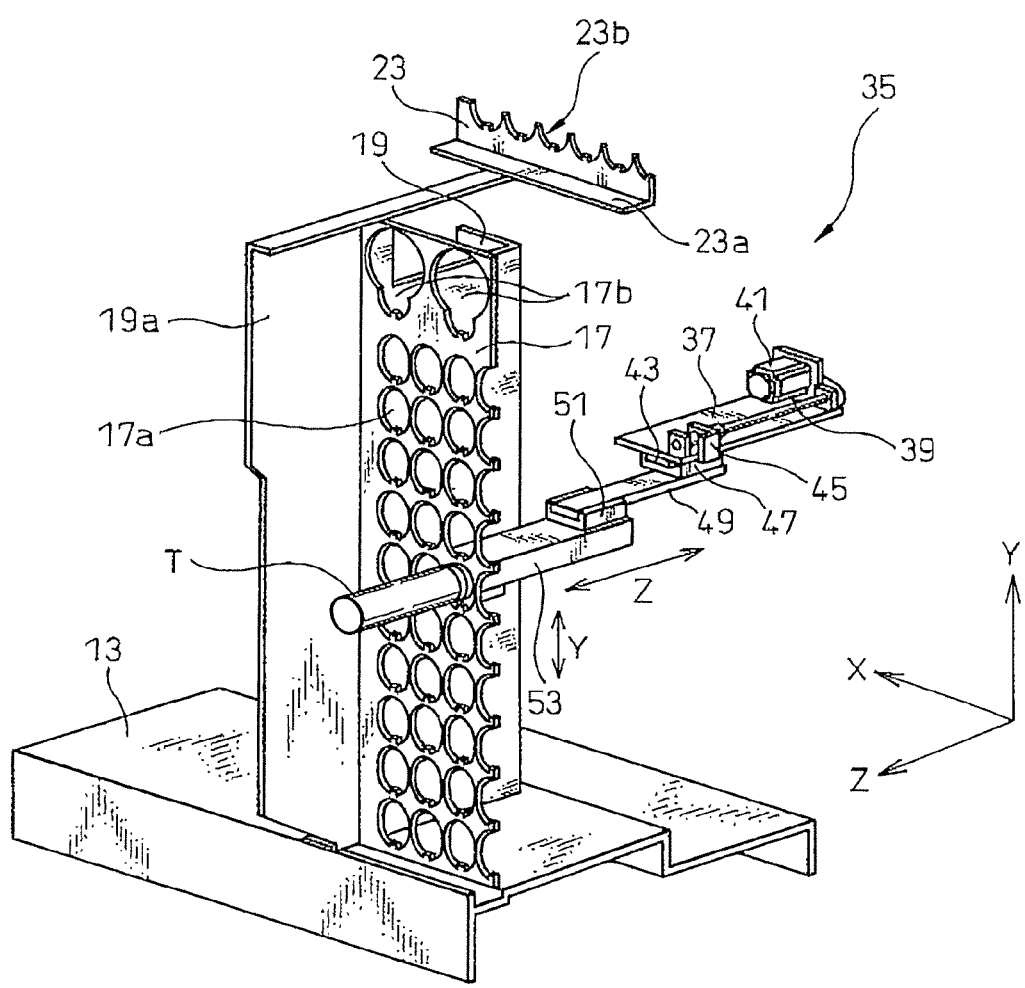
FIG. 6 is a view which is the same as FIG. 5 in which a carriage is located at an extending position.

Referring to FIGS. 5 and 6, a mode of operation of the present embodiment will be explained. In this explanation, a case is taken as an example in which the tools T are attached to the rack body portion 17, that is, the tools T are attached to the first tool accommodating portion.

In FIG. 5, the carriage 35 is located at the tool changing position P where the tool T is given and received between the carriage 35 and the tool changing arm 55a. The carriage 35 receives the tool T, which corresponds to the tool $T_1$ shown in FIG. 1, from the tool changing arm 55a. Then, the carriage 35 holds this tool T. Next, as shown in FIG. 6, the carriage 35 is moved by the carriage moving means 27, 29, 31 to a predetermined position, for example, the carriage 35 is moved by the carriage moving means 27, 29, 31 to the position facing the first tool receiving hole 17a which is in the third row from the left and at the fifth position from the top in the first tool receiving hole arranged in a matrix form of the first tool accommodating portion. At this time, the carriage 35 is arranged at a position where the tool T can pass in a large diameter portion on the upper side in the first tool receiving hole 17a. Next, in the carriage 35, the motor 41 is rotated and the first and the second slider 47, 51 are moved forward through the ball screw 39 and the nut 45, so that the tool T held at the tip portion of the arm 53 is introduced into the first tool receiving hole 17a. Next, the carriage 35 is a little moved downward in the direction of Y-axis along the moving column 31, so that the V-shaped groove 57 of the tool holder TH of the tool T to be held can be engaged with the top-shaped member 59 in the first tool receiving hole 17a. Next, the motor 41 is rotated and the arm 53 is made to go back in the direction of Z-axis through the ball screw 39 and the nut 45. In this way, the tool holding means 63 attached to the tip portion of the arm 53 is separated from the shank portion S of the tool holder TH. Due to the foregoing, the tool T is engaged with and held by the first tool accommodating portion of the tool magazine 11. In more detail, the tool T is engaged with and held by one of the first tool receiving holes 17a.

The following will be understood. In order to pick up the tool T ($T_1$ or $T_2$) from the rack body portion 17 of the first tool accommodating portion, a process opposite to the process described above may be executed.

Next, referring to FIGS. 7 and 8, a mode of operation in the case where the tool T is attached to the second tool accommodating portion will be explained below.

Figure 7:
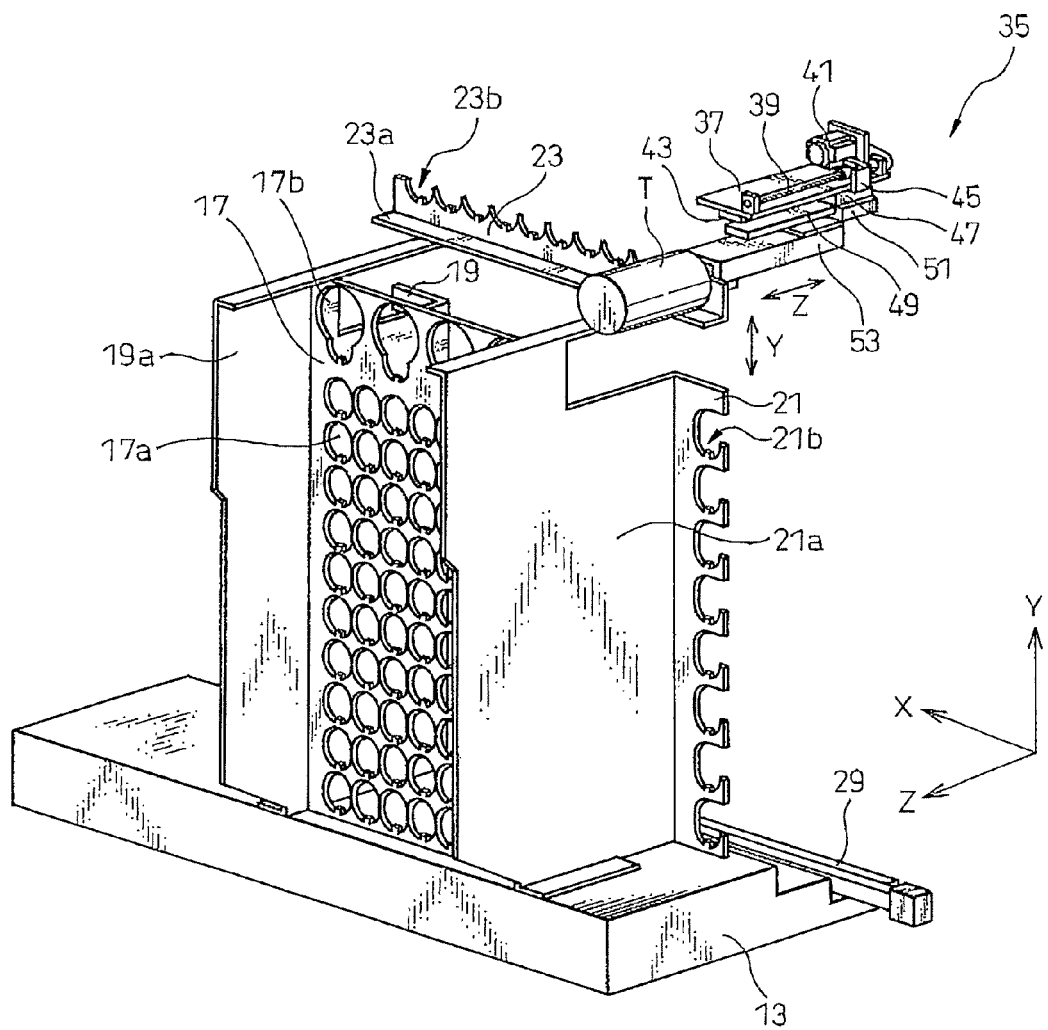
FIG. 7 is a perspective view of the tool magazine shown in FIG. 1 for explaining an action of attaching tools to a side rack.
Figure 8:
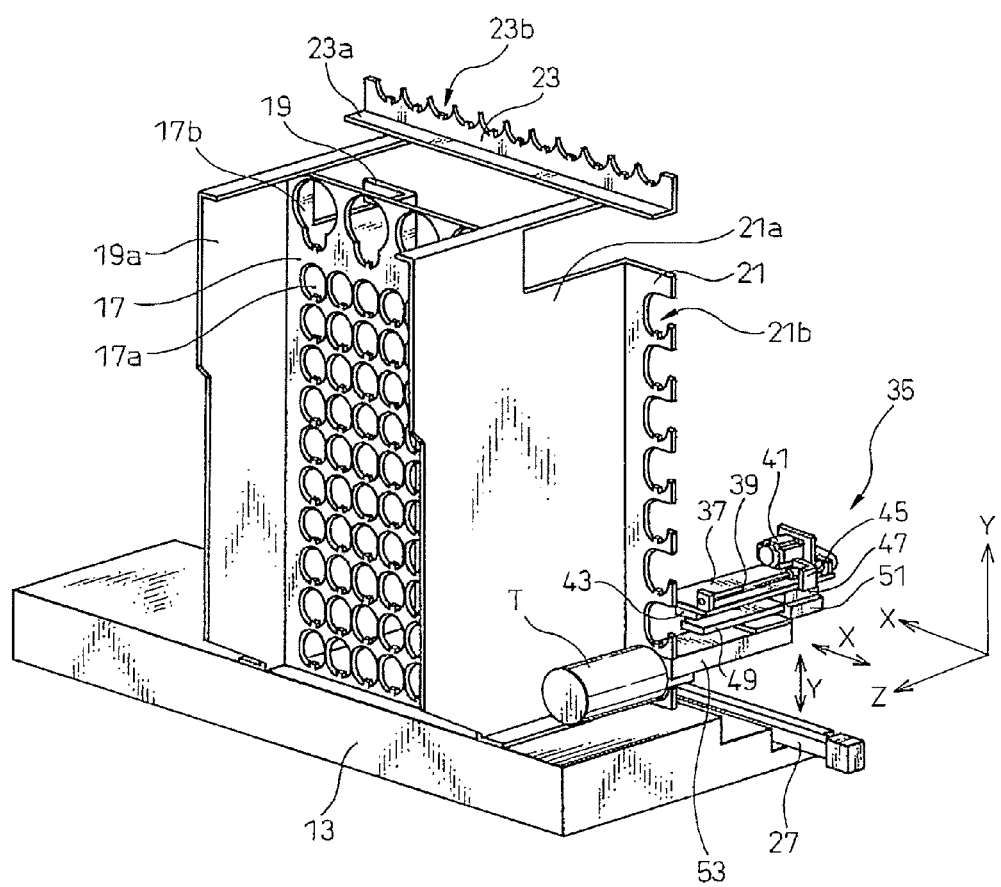
FIG. 8 is a view which is the same as FIG. 7 in which the carriage is located at an extending position.

In FIG. 7, in the same manner as that of FIG. 5, the carriage 35 is located at the tool changing position P at which the tool is changed between the arm 55a and the carriage 35. At the tool replacing position P, the tool T corresponding to the tool $T_3$, $T_4$ shown in FIG. 1 is received from the arm 55a and held by the carriage 35. Next, as shown in FIG. 8, by the carriage moving means 27, 29, 31, the tool T is moved to a predetermined position. For example, the tool T is moved to a side position of the tool receiving dent portion 21b at the lowermost stage of the side rack portion 21 on the right side with respect to the surface of the drawing in the embodiment shown in the drawing in the side rack portions 19, 21 and the upper rack portion 23 forming the second tool accommodating portion. At this time, the carriage 35 is placed at a position where the tool T can pass through the cutout 21c of the tool receiving dent portion 21b. Next, in the carriage 35, the motor 41 is rotated and the second slider 51 is moved forward along Z-axis through the ball screw 39 and the nut 45 to a position at which the V-shaped groove 57 of the tool holder TH of the tool T held at the tip of the arm 53 can be engaged with the top-shaped member 59 of the tool receiving dent portion 21b.

Next, the carriage 35 moves along the upper and lower rails 27, 29 in the direction of X-axis and introduces the tool T, which is held by the carriage 35, into the tool receiving dent portion 21b and moves downward along the moving column 31 in the direction of Y-axis. Then, the V-shaped groove 57 of the tool holder TH is engaged with the top-shaped member 59 of the tool receiving dent portion 21b. Next, the motor 41 is rotated and the arm 53 is made to go back through the ball screw 39 and the nut 45 in the direction of Z-axis and the tool holding means 63 attached to the tip of the arm 53 is separated from the shank portion S of the tool holder TH. Due to the foregoing, the tool T is engaged with and held by the second tool accommodating portion of the tool magazine 11. In more detail, the tool T is engaged with and held by one of the tool receiving dent portion 21b of the side rack portion 21.

The following may be understood. In order to pick up the tool T ($T_3$, $T_4$) from the side rack portion 19, 21 of the second tool accommodating portion, a process opposite to the process described above may be executed.

In order to attach the tool T ($T_5$, $T_6$) to the upper rack portion 23 of the second tool accommodating portion, the tool T ($T_5$, $T_6$) is moved downward to the tool receiving dent portion 23b and the V-shaped groove 57 of the tool holder TH is engaged with the top-shaped member 59 of the tool receiving dent portion 23b. Further, in order to pick up the tool T ($T_5$, $T_6$) from the upper rack portion 23, the tool T ($T_5$, $T_6$) is moved upward from the tool receiving dent portion 23b.

Figure 4:
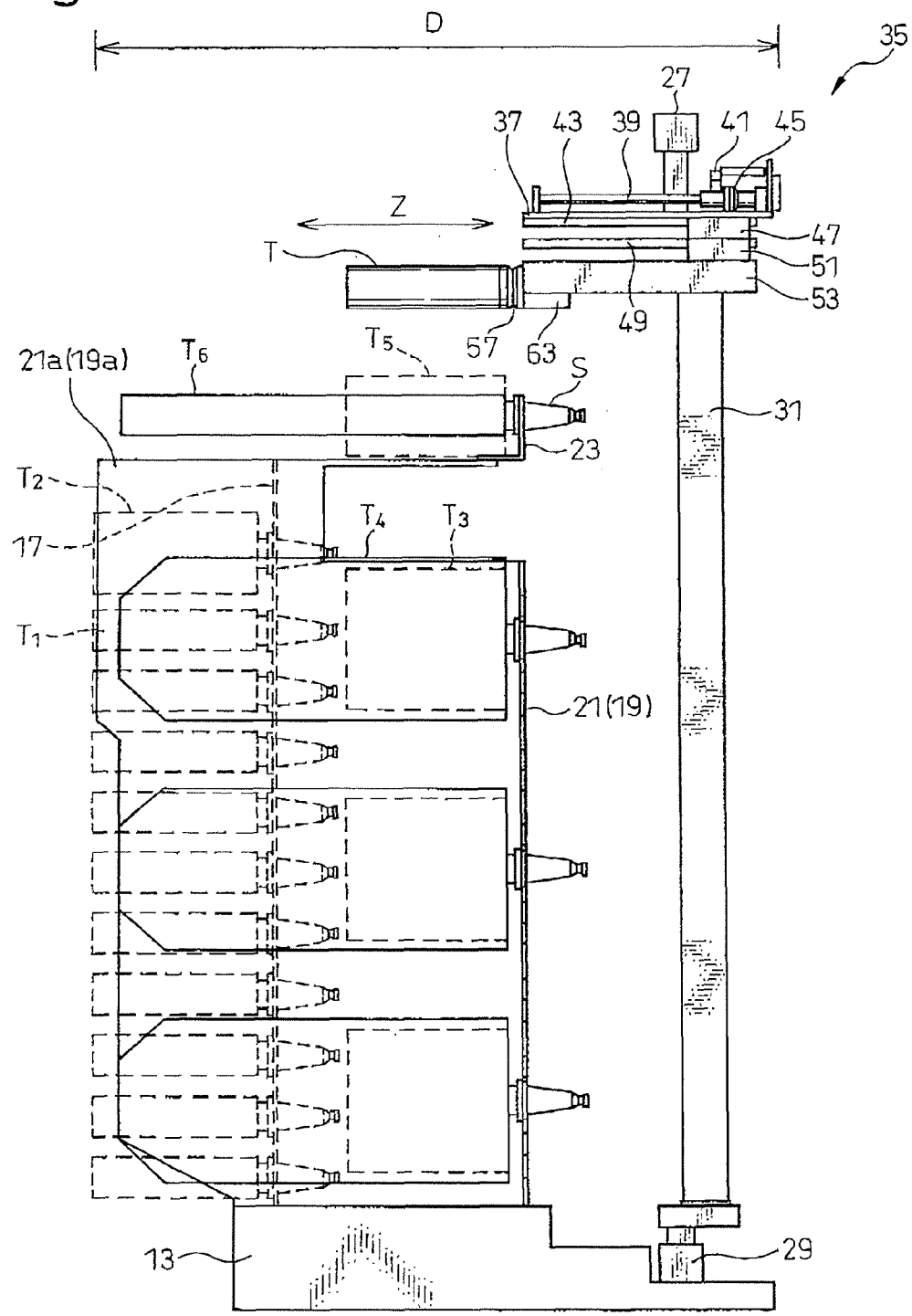
FIG. 4 is a side view of the tool magazine shown in FIG. 1.

As described above, the second tool accommodating portion for accommodating the long tools is arranged at the rear of the first tool accommodating portion for accommodating the short tools being offset, i.e., the second tool accommodating portion for accommodating the long tools is arranged on a face different from the face of the first tool accommodating portion. In the first tool accommodating portion, the tool receiving holes are formed. In the second tool accommodating portion, the tool receiving dent portions having cutout portions are formed. The short tools are attached to and detached from the tool receiving holes of the first tool accommodating portion in the direction of Z-axis. The long tools are attached to and detached from the tool receiving dent portions of the second tool accommodating portion in the directions of X-axis and Y-axis. Therefore, the thickness D of the entire tool magazine in the direction of Z-axis in FIG. 4 can be made shorter than that in the case where the long tools are accommodated in the tool magazine of the second prior art described before.

The invention claimed is:

1. A tool magazine for accommodating a plurality of tools, each having a shank, a tip and at least one face, wherein the central axes of the tools can be positioned horizontal and parallel to each other, comprising:
a first tool accommodating portion having a tool holding member formed out of a plate-shaped member on which a plurality of tool receiving holes in which the tools can pass are formed, the tool holding member holding the tools when lower portions of the tool receiving holes are engaged with V-shaped grooves of flange portions of the tools; and
a second tool accommodating portion having a tool holding member, which is attached to the periphery of the first tool accommodating portion, formed out of a plate-shaped member on which a plurality of tool receiving dent portions capable of receiving the tools are formed, the tool holding member holding the tools when lower portions of the tool receiving dent portions are engaged with the V-shaped grooves of the flange portions of the tools,
wherein the second tool accommodating portion is arranged parallel to the first tool accommodating portion, and offset from the face of the first tool accommodating portion toward the shank side of the accommodated tools.

2. The tool magazine according to claim 1, wherein the second tool accommodating portion is arranged at least on one of the left side, the right side, the upper side and the lower side as viewed at the first tool accommodating portion from the tip side to the shank side of the accommodated tools.

3. The tool magazine according to claim 2, further comprising a tool conveying device, the tool conveying device including:
a tool holding means for holding shank portions of the tools, arranged at the shank side relative to the first and the second tool accommodating portion in the direction of the central axes of the accommodated tools; and
a moving means for moving the tool holding means in the directions of three axes making a right angle with each other.

4. The tool magazine according to claim 2, further comprising at least three pieces disposed along the periphery of each of the tool receiving holes and the tool receiving dent portions, each of the at least three pieces defining a circumferentially-extending protrusion for engaging with the V-shaped groove of the tool held in the tool receiving hole or the tool receiving dent portion.

5. The tool magazine according to claim 1, further comprising at least three pieces disposed along the periphery of each of the tool receiving holes and the tool receiving dent portions, each of the at least three pieces defining a circumferentially-extending protrusion for engaging with the V-shaped groove of the tool held in the tool receiving hole or the tool receiving dent portion.

6. The tool magazine according to claim 5, further comprising a tool conveying device, the tool conveying device including:
a tool holding means for holding shank portions of the tools, arranged at the shank side relative to the first and the second tool accommodating portion in the direction of the central axes of the accommodated tools; and
a moving means for moving the tool holding means in the directions of three axes making a right angle with each other.

7. The tool magazine according to claim 1, further comprising a tool conveying device, the tool conveying device including:
a tool holding means for holding shank portions of the tools, arranged at the shank side relative to the first and the second tool accommodating portion in the direction of the central axes of the accommodated tools; and
a moving means for moving the tool holding means in the directions of three axes making a right angle with each other.

* * * * *